United States Patent
Pan et al.

(10) Patent No.: US 6,964,697 B2
(45) Date of Patent: Nov. 15, 2005

(54) METAL SOLUTION-DIFFUSION MEMBRANE AND METHOD FOR PRODUCING THE SAME

(75) Inventors: Xiulian Pan, Stuttgart (DE); Norbert Stroh, Magstadt (DE); Herwig Brunner, Stuttgart (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 10/484,774

(22) PCT Filed: Jul. 3, 2002

(86) PCT No.: PCT/DE02/02415

§ 371 (c)(1),
(2), (4) Date: Mar. 24, 2004

(87) PCT Pub. No.: WO03/011433

PCT Pub. Date: Feb. 13, 2003

(65) Prior Publication Data

US 2005/0011359 A1    Jan. 20, 2005

(30) Foreign Application Priority Data

Jul. 25, 2001  (DE) ................ 101 35 390

(51) Int. Cl.[7] ............ B01D 53/22; B01D 71/02
(52) U.S. Cl. ............ 96/10; 95/56; 96/11; 55/524; 55/DIG. 5
(58) Field of Search ............. 96/4, 8, 10, 11; 95/55, 56; 55/524, DIG. 5

(56) References Cited

U.S. PATENT DOCUMENTS

| | | | |
|---|---|---|---|
| 4,364,759 A | 12/1982 | Brooks et al. | |
| 4,689,150 A * | 8/1987 | Abe et al. | 210/490 |
| 4,853,001 A * | 8/1989 | Hammel | 95/47 |
| 4,865,630 A * | 9/1989 | Abe | 96/11 |
| 5,215,729 A | 6/1993 | Buxbaum | |
| 5,393,325 A * | 2/1995 | Edlund | 95/56 |
| 5,498,278 A * | 3/1996 | Edlund | 96/11 |
| 5,782,959 A * | 7/1998 | Yang et al. | 96/11 |
| 6,152,987 A * | 11/2000 | Ma et al. | 95/56 |
| 6,214,090 B1 | 4/2001 | Dye et al. | 95/56 |
| 6,267,801 B1 * | 7/2001 | Baake et al. | 95/56 |
| 6,461,408 B2 * | 10/2002 | Buxbaum | 95/55 |
| 6,572,683 B2 * | 6/2003 | Yoshida et al. | 96/11 |
| 6,649,559 B2 * | 11/2003 | Drost et al. | 502/182 |
| 6,828,037 B2 * | 12/2004 | Uemura et al. | 428/613 |
| 2001/0000380 A1 | 4/2001 | Buxbaum | |
| 2003/0000387 A1 * | 1/2003 | Uemura et al. | 96/11 |
| 2003/0183080 A1 * | 10/2003 | Mundschau | 95/55 |
| 2003/0213365 A1 * | 11/2003 | Jantsch et al. | 96/11 |
| 2004/0129135 A1 * | 7/2004 | Roark et al. | 95/55 |

* cited by examiner

Primary Examiner—Robert H. Spitzer
(74) Attorney, Agent, or Firm—Breiner & Breiner, L.L.C.

(57) ABSTRACT

A metal solution-diffusion membrane of a macroporous base on which a thin metal membrane layer is formed is disclosed. In the membrane, the base includes a hollow fiber with a metal material containing an intermediate layer being formed between the hollow fiber and the metal membrane layer. The metal solution-diffusion membrane can be made with a very thin metal membrane layer with high permeability and possesses long-term stability as well as a great separation surface/volume ratio. A method for producing a metal solution-diffusion membrane in which the intermediate layer serves to provide nuclei for the subsequent currentless deposition of the metal layer is also disclosed.

14 Claims, 1 Drawing Sheet

METAL SOLUTION-DIFFUSION MEMBRANE AND METHOD FOR PRODUCING THE SAME

FIELD OF THE INVENTION

The present invention relates to a metal solution-diffusion membrane from a macroporous base on which a thin metal membrane layer is formed as well as to a method for producing this metal solution-diffusion membrane.

Metal solution-diffusion membranes play a major role in purifying or filtering gases in industrial processes. The growing demand for hydrogen as a fuel or as a reaction product in the chemical industry has attracted the attention of research to the production, purification and use of hydrogen. Purifying respectively filtering hydrogen plays a vital role in this. Particularly metal solution-diffusion membranes, as for example palladium membranes, are especially suited for separating and purifying hydrogen for applications in the electronics, the metal or the chemical industries. The drawbacks associated with palladium membranes are, in particular, little permeability and little long-term stability as well as a low separation-volume ratio.

DESCRIPTION OF THE PRIOR ART

Hitherto palladium membranes were usually applied onto large surface porous carrier bodies. For example, it is prior art to produce palladium membranes in the form of foils that are then applied onto a carrier structure. Foils of this type, however, can only be produced with a minimal thickness of usually approximately 7 $\mu$m so that permeability is not high enough for some applications.

A method of producing a metal-ceramic catalyst membrane for producing a very thin membrane layer on a macroporous base is known from H. Zhao et al's, Catal. Today, 1995, 25, 237 to 240. In this method, a thin metal-containing membrane layer is generated on a macroporous ceramic base. The metal is applied onto solid state particles, which are generated as a thin covering layer on the carrier body.

A disadvantage of this thin membrane layer as well as of the above-mentioned foil membranes, however, continues to be insufficient long-term stability. In certain applications, such type membranes are exposed to high temperatures so that the difference in thermal expansion coefficients between the base and the metal membrane layer in conjunction with the turning brittle of the metal layer upon contact with the hydrogen leads to great stress, which can lead to detachment of the base and the membrane layer at the not optimum joints. Especially with the usually employed large-surface plate-shaped base bodies, this can lead to function failure of the membrane.

The object of the present invention is to provide a metal solution-diffusion membrane as well as a method for producing the same, which possesses higher long-term stability with high surface-volume ratio and greater permeability.

SUMMARY OF THE INVENTION

The object of the present invention is solved with the metal solution-diffusion membrane and the method according to the claims. Advantageous embodiments of the membrane and the method are the subject matter of the subclaims.

The present metal solution-diffusion membrane comprises a macroporous hollow fiber as the base on which a thin metal membrane layer is formed over at least one thin, metal material-containing intermediate layer.

The combination of a hollow fiber as the base with a thin metal coating yields a completely encompassing metal membrane layer which does not lose its filter property even due to detachments of the base at not optimum joints. Such type local detachment therefore does not lead to function failure of the membrane.

Optimum function of the thin membrane layer requires a uniform, homogeneous substructure which, in the present membrane, is formed as an intermediate layer between the hollow fiber and the metal membrane layer. Especially this intermediate layer permits realizing a very thin metal membrane layer on the hollow fiber. The very thin membrane layer, for its part, leads to very high permeability of the membrane, for example for hydrogen. Furthermore, the use of a hollow fiber as the base yields a very good surface/volume ratio. A multiplicity of such type coated hollow fibers can be used in a filter element.

The metal membrane layer can, for example, form a layer thickness in the range between 0.1 and 10 $\mu$m. Preferably, it has a layer thickness in the range between 0.7 and 1 $\mu$m. The intermediate layer can possess a layer thickness between 1 and 10 $\mu$m, preferably the layer thickness of the intermediate layer is between 2 to 3 $\mu$m. In the preferred embodiment, this intermediate layer is formed of particles of a sol, which are coated with a salt of the metal of the metal membrane layer. The pore size of the intermediate layer lies preferably in the range of approximately 6 nm. The production of such a type intermediate layer is, for example described in J. Zhao et al's above mentioned publication. The layer produced as a membrane layer therein acts in the present membrane as an intermediate layer.

The employed hollow fibers preferably have an outer diameter in the range between 80 and 1500 $\mu$m, a wall thickness in the range between 10 and 200 $\mu$m as well as an average pore size of about 0.2 $\mu$m. A smaller outer diameter is associated with less wall thickness.

The hollow fibers can, for example, be formed from a ceramic or a metallic material. For this purpose, $Al_2O_3$ is especially suited as the ceramic material. Metals for the metal membrane-layer are preferably palladium, nickel, platinum or alloys thereof. Other metals can also be employed for gas separation processes. Examples therefor are copper, iron, silver, aluminum or alloys thereof.

In the present method for producing the metal solution-diffusion membrane, one or a multiplicity of macroporous hollow fibers are provided or produced on whose surface a homogeneous intermediate layer is applied which contains metal nuclei for subsequent currentless deposition of a metal membrane layer. The intermediate layer is then passivated. Finally, the thin metal membrane layer is applied onto this intermediate layer by means of currentless deposition.

Preferably the application of the homogenous intermediate layer occurs using a method according to J. Zhao et al's above mentioned publication, i.e. application of a Böhmit sol modified with metal complexes and followed by calcination.

In a preferred embodiment in which the pore size of the macroporous hollow bodies for direct application of the sol is too large, an additional intermediate layer with a smaller pore size is applied onto the hollow fiber, so that the sol particles cannot or only to a small extent penetrate into the pores.

A BRIEF DESCRIPTION OF THE DRAWINGS

The present metal solution-diffusion membrane and the method to produce the same are made more apparent in the following using a preferred embodiment with reference to the drawings without the intention of limiting the scope or spirit of the overall inventive idea.

WAYS TO CARRY OUT THE INVENTION

Figure 1:
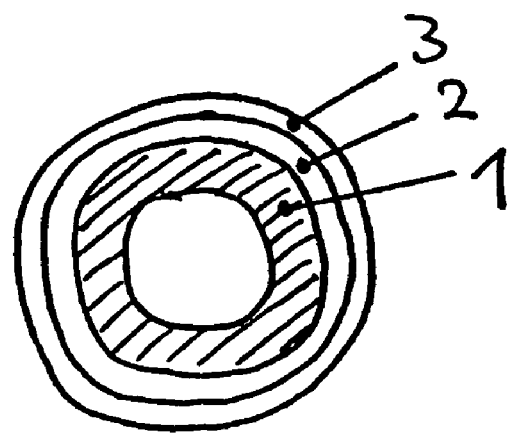
FIG. 1 shows the basic buildup of the present solution-diffusion membrane.

FIG. 1 shows in a very schematic representation a cross section of the basic buildup of the present solution-diffusion membrane using a preferred embodiment, in which a single intermediate layer 2 is disposed between the metal membrane layer 3 and the hollow fiber 1. This intermediate layer 2 provides, on the one hand, the nuclei for currentless deposition of the metal layer 3 and acts, on the other hand, as a homogeneous substrate for the currentless deposition of the metal membrane layer 3.

In the present example, a macroporous $\alpha$-$Al_2O_3$ hollow fiber which, for example, can be produced using a spin-extrusion technique is provided as the hollow fiber. The hollow fibers utilized in this preferred embodiment have an outer diameter of 700 to 800 $\mu$m, an inner diameter of 500 to 600 $\mu$m and an average pore size of 0.2 $\mu$m. A Böhmit sol modified with a palladium complex is applied onto the surface of these fibers in order to place palladium nuclei on the surface of the ceramic hollow fibers. These palladium nuclei act as catalysts for the subsequent currentless deposition of palladium.

The modified sol is applied using a dip coating process. Simultaneously a vacuum is applied to the inner volume respectively the hollow channel of the hollow fibers. The particle size of the sol is approximately 60 to 100 nm. By applying a vacuum to the inner surface of the hollow fibers, a small part of the sol particle penetrates into the pores of the hollow fibers thereby improving adhesion of the intermediate layer to the hollow fiber.

Following this, calcination occurs at 750° in the air. Then the surface is reduced respectively passivated at approximately 200° flowing hydrogen.

The average pore size of the yielded Pd/$\gamma$-$Al_2O_3$ intermediate layer is about 5.7 nm in this execution of the method. The narrow pore size distribution and the very homogeneous surface of this intermediate layer permits the subsequent defectless deposition of an ultra thin palladaium layer. The currentless deposition process is based on a chemical reaction between $[PdEDTA]^{2-}$ and hydrazine under the catalytic effect of the palladium nuclei. In this method, the surface of the hollow fibers respectively the intermediate layer applied thereupon is covered with a continuous, dense palladium layer which has a little thickness of just 0.6$\mu$m. The duration of the currentless deposition process with such a layer thickness is in the present example about 1 hour.

The result is that a metal solution-diffusion membrane is yielded comprising a macroporous ceramic hollow fiber, an intermediate layer with about 3 to 4 $\mu$m thickness as well as an ultra-thin palladium layer with a thickness of about 0.6 $\mu$m applied thereupon.

The hydrogen transport through a palladium membrane is characterized by a solution-diffusion mechanism with the following steps:

a) reversible dissociative chemisorption of $H_2$ on the membrane surface;

b) volume diffusion of the hydrogen atoms into the metal due to the driving force of the concentration gradient; and c) recombination of the hydrogen atoms to molecules on the opposite surface and desorption.

Usually in thick metal membranes, the hydrogen transport is determined by the volume diffusion, whereas in the present thin metal membrane, the reaction process of the hydrogen with the metal surface plays the decisive role.

In comparison to the metallic membrane layer, the intermediate layer does not play an additional limiting role for hydrogen transport due to its pore size of approximately 6 nm.

Figure 2:
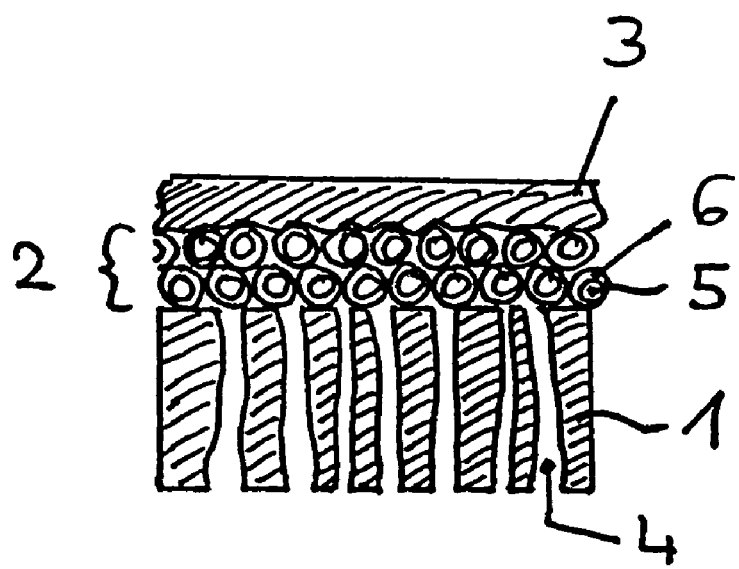
FIG. 2 shows a schematic representation of the layer structure of the present solution-diffusion membrane.

The basic layer buildup of the present solution-diffusion membrane is seen again in FIG. 2. This figure shows a section of the hollow fiber 1 with the through-going macropores 4. The intermediate layer 2 is formed on the surface of the hollow fiber 1. This intermediate layer is composed of sol particles 5 coated with metal salts 6. Finally the metal membrane layer 3 is applied onto the intermediate layer.

Such a type metal solution diffusion membrane as produced with the process steps of the preferred embodiment described in the preceding possesses yields excellent long-term stability. The separation factor hydrogen/nitrogen, which is defined by the permeability ratio of pure hydrogen to pure nitrogen is more than 1000 in such a type membrane. Besides a high separation surface/volume ratio, the membrane possesses high permeability and can, moreover, be produced with little cost, because little expensive metal material is required for the membrane layer.

LIST OF REFERENCE NUMBERS 1 macroporous hollow fiber
2 intermediate layer
3 metal membrane layer
4 macropores
5 sol particles
6 metal salt

What is claimed is:

1. A metal solution-diffusion membrane comprising a macroporous base layer comprising hollow fiber, a metal membrane layer, and an intermediate layer between said macroporous base layer and said metal membrane layer, wherein said intermediate layer comprises particles of a sol, said particles being coated with a salt of a metal of said metal membrane layer.

2. A metal solution-diffusion membrane according to claim 1, wherein said metal membrane layer has a layer thickness in a range between 0.1 and 10 $\mu$m.

3. A metal solution-diffusion membrane according to claim 1, wherein said metal membrane layer has a layer thickness in a range between 0.7 and 1 $\mu$m.

4. A metal solution-diffusion membrane according to claim 1, wherein said intermediate layer has a layer thickness in a range between 1 and 10 $\mu$m.

5. A metal solution-diffusion membrane according to claim 1, wherein said intermediate layer has a layer thickness in a range between 2 and 3 $\mu$m.

6. A metal solution-diffusion membrane according to claim 1, wherein said hollow fiber has an outer diameter in a range between 80 and 1500 µm, a wall thickness in a range between 10 and 200 µm and an average pore size of approximately 0.2 µm.

7. A metal solution-diffusion membrane according to claim 1, wherein said hollow fiber is formed from a ceramic material.

8. A metal solution-diffusion membrane according to claim 1, wherein said hollow fiber is formed from a metal material.

9. A metal solution-diffusion membrane according to claim 1, wherein said metal membrane layer is formed from palladium or a palladium alloy.

10. A method for producing the metal solution-diffusion membrane according to one of claims 1, 2, 3, 4, 5, 6, 7, 8 or 9 comprising:
    providing at least one macroporous hollow fiber;
    applying onto said at least one hollow fiber said intermediate layer, said intermediate layer including metallic nuclei for subsequent currentless deposition of the metal membrane layer;
    passivating said intermediate layer; and
    applying said metal membrane layer by means of currentless deposition.

11. A method according to claim 10, wherein said applying of said intermediate layer occurs by means of applying a Böhmit sol modified with metal complexes and subsequent calcination.

12. A method according to claim 11, wherein said applying of said intermediate layer occurs using a dip coating process, while a vacuum is generated in an interior of said hollow fiber.

13. A method according to claim 10, wherein said passivating occurs by means of hydrogen flowing over said intermediate layer.

14. A method for producing a metal solution-diffusion membrane comprising a macroporous base layer comprising hollow fiber, a metal membrane layer, and an intermediate layer between said macroporous base layer and said metal membrane layer, wherein said intermediate layer comprises particles of a sol, said particles being coated with a salt of a metal of said metal membrane layer, said method comprising:
    providing at least one macroporous hollow fiber;
    applying onto said at least one hollow fiber said intermediate layer by means of applying a Böhmit sol modified with metal complexes and subsequent calcination, said intermediate layer including metallic nuclei for subsequent currentless deposition of the metal membrane layer;
    passivating said intermediate layer; and
    applying said metal membrane layer by means of currentless deposition.

* * * * *